Jan. 23, 1962
J. B. BIDWELL
3,018,041
HYDRAULIC FUNCTION GENERATOR
Filed May 24, 1957
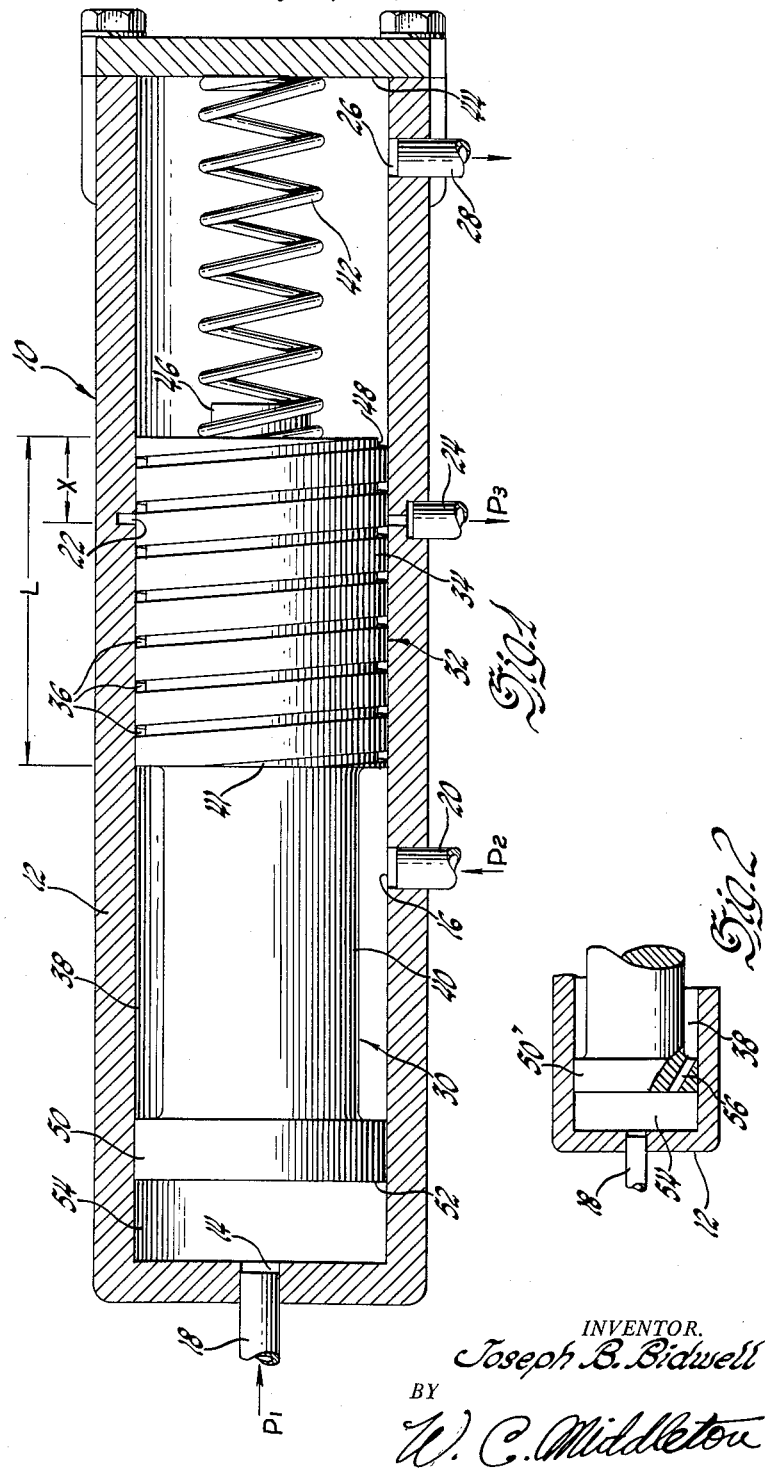
INVENTOR.
Joseph B. Bidwell
BY
W. C. Middleton
ATTORNEY 3,018,041
HYDRAULIC FUNCTION GENERATOR
Joseph B. Bidwell, Royal Oak, Mich., assignor to General Motors Corporation, Detroit, Mich., a corporation of Delaware
Filed May 24, 1957, Ser. No. 661,505
3 Claims. (Cl. 235—61)

This invention relates to a fluid pressure control mechanism.

It is an object of this invention to provide a fluid pressure system having an output pressure that varies as a function of two different input pressures.

It is another object of this invention to provide a fluid pressure system having a valve mechanism for varying the output pressure as a function of an input pressure and the movement of the valve.

It is also an object of this invention to provide a fluid pressure system having a plurality of conduits with a valve control mechanism adapted to be moved by the fluid pressure in one of the conduits for varying the output pressure of the system as a function of an input pressure to the valve and the pressure acting to move the valve.

It is also an object of this invention to provide a control mechanism for controlling the output pressure of a fluid system as a function of two input pressures in which the mechanism consists of a movable valve having restrictor means connecting one of the input pressures to the output pressure.

Other features, advantages and objects will become apparent by reference to the detailed description of the invention and to the drawings wherein:

FIGURE 1 is a cross section of a cylinder and valve embodying this invention, and FIGURE 2 is a partial cross sectional view of a modification of FIGURE 1.

Referring now to the drawings and more particularly to FIGURE 1, 10 indicates a fluid pressure control mechanism including a cylinder 12 having a plurality of inlet ports 14 and 16 cooperating with a plurality of conduits or passages 18 and 20 containing fluid under different varying pressures $P_1$ and $P_2$; and an annular discharge port or outlet 22 connecting with a conduit 24 leading to a mechanism (not shown) to be actuated by a fluid pressure $P_3$. A drain port 26 is also provided with a conduit 28 leading to a sump (not shown) for relieving a portion of the cylinder.

Within cylinder 12 is positioned a movable spool valve 30 for connecting the fluid pressure $P_2$ in inlet port 16 to outlet 22. Valve 30 is formed at one end 32 thereof on its outer surface with a continuous helically grooved fluid restrictor means 34, in constant communication with outlet port 22 by means of a relatively long annular groove 36 of constant cross section, and in communication with fluid inlet port 16 by means of a chamber 38 formed within the cylinder by reducing a portion 40 of the valve.

Since the length of the continuous helically wound groove is long in relation to its cross-sectional area, with the use of a suitable viscous fluid, the fluid will pass therethrough at a slow rate and will assume the characteristics of laminar or streamline flow, wherein the output pressure at any point along the groove will vary as a straight line function of the distance from the inlet, i.e., the pressure is a maximum at the inlet and decreases proportionately due to its viscosity as the fluid moves along the groove away from the inlet, until a point is reached when the output pressure is substantially zero. In the embodiment illustrated here with laminar fluid flow characteristics, the pressure in the groove will vary from a maximum at the inlet 41 to zero at the outlet end 48, with a varying pressure inbetween.

The position of valve 30 when groove end 48 is aligned withoutput port 22, i.e., when $P_3$ pressure is zero, is termed the "neutral" position here for the sake of convenience.

Since the cross-sectional area of the groove is small, with a correspondingly long distance over which the fluid travels, turbulence, etc., due to high $P_2$ pressures at the inlet end will not affect the laminar flow pattern because the flow through the groove is at a slow rate.

Since outlet port 22 is in constant communication with the groove, movement of the valve and therefore the restriction means will position inlet 41 closer to outlet port 22 and will therefore increase the pressure in conduit 24 in accordance with movement of the valve up to a maximum wherein outlet conduit 22 is aligned with groove inlet 41.

This straight line relationship may be expressed mathematically as follows:

(1) $$P_3 = P_2 \left(\frac{X}{L}\right)$$

where L is the length of the grooved valve portion, and X is the distance groove end 48 is displaced from outlet port 22.

Movement of valve 30 to its various positions is accomplished as follows. The valve is formed at one end thereof with a land 50 having a face 52 adapted to be acted upon by fluid pressure in a chamber 54 communicating with conduit 18. Opposing the action of the fluid pressure in chamber 54 and therefore tending to maintain the valve in its "neutral" position is a spring 42 positioned between the end 44 of the cylinder and a boss 46 on the other end of the valve. Therefore, movement of the valve is controlled by the fluid pressure $P_1$ opposed by the spring force.

Referring to Formula 1, since the spool is positioned by equilibrium between the spring 42 and pressure $P_1$, and if the spring force is zero when X equals zero, then the displacement X may be expressed mathematically as:

(2) $$X = KP_1$$

where K is the spring factor per unit area.

Furthermore, the pressure $P_3$ will now vary as a function of the pressure $P_2$ in inlet 20 and the movement of the valve as determined by the pressure $P_1$ in inlet 18, which is expressed mathematically by substituting (2) into (1) giving us (3) $$P_3 = \left(\frac{K}{L}\right) P_1 P_2$$

Thus, it is seen that the output pressure $P_3$ is proportional to the product of the two applied pressures $P_1$ and $P_2$.

If the spring load is not zero at $X=0$, then the spring force will have an added constant force C per unit area as a factor to be subtracted from the force $P_1$, i.e., if the spring were preloaded to, say 10 p.s.i., this would be subtracted from $P_1$ to establish equilibrium. Formula 3 would then be expressed as:

(4) $$P_3 = \left(\frac{K}{L}\right) P_2 (P_1 - C)$$

Also, if the groove 36 were of a non-uniform cross section, then the output pressure $P_3$ would vary as a function of the input pressure $P_2$ multiplied by some function $f$ of the force $P_1$ acting on the valve, which would be determined by variation in groove section. This would be expressed in the manner of Formula 3 as:

(5) $$P_3 = \left(\frac{K}{L}\right) P_2 f(P_1)$$

Furthermore, if the inlet port 16 and pressure $P_2$ were blocked off, and communication was made between chambers 38 and 54 by means of passage 56 in land 50' as seen in FIGURE 2, it would be clear that the output pressure $P_3$ would vary as a function of the square of the input pressure $P_1$, which can be seen by making $P_2$ equal to $P_1$ in Formula 3, which gives:

(6) $$P_3 = \left(\frac{K}{L}\right)P_1^2$$

It will be obvious, of course, that the pressures $P_1$ and $P_2$ could be representative of any of a variety of conditions, such as drive or driven shaft speed, engine or load torque, etc., so as to produce an output pressure that various as a function of both speed and torque, for example.

Referring now to the general operation of the mechanism, with zero pressure $P_1$ in conduit 18, the valve will be positioned by spring 42 with land 50 abutting the end of the cylinder at port 14, the groove inlet 41 at inlet port 16, and the outlet 48 at outlet port 22, therefore causing $P_3$ to be zero regardless of the pressure of $P_2$ in inlet 20.

Upon an increase in pressure in chamber 54 sufficiently to overcome the action of spring 42, valve 30 will move to increase the displacement X thereby providing a proportional output pressure increase in outlet 22. Further increases in $P_1$ pressure will move the valve until $P_3$ is equal to $P_2$, with inlet 41 positioned adjacent outlet 22.

Thus, it will be seen that the output pressure $P_3$ varies as a function of the increase or decrease of $P_1$ and $P_2$ pressures, or the increase and decrease of $P_2$ and the movement of the valve.

From the foregoing it will be seen that applicant has provided a novel valve controlling mechanism for use in a fluid system to provide an output pressure that varies as a function of two different input pressures, permitting the use of a single conduit for actuating a fluid pressure mechanism by pressure that is a combination of several different forces. It will be understood that the invention can be modified beyond the illustrated embodiments, and therefore, any limitations to be imposed are those set forth in the following claims:

I claim:

1. A fluid pressure system including first, second and third conduit means each adapted to contain a fluid under a varying pressure, and means connecting said first and second conduits for producing a continuously variable pressure in said second conduit that varies as a function of the changes in pressures in said first and third conduits, said connecting means comprising movable restrictor means having connections with said first and second conduits, said restrictor means being of a shape as to vary the pressure between said first and second conduits from a maximum to a minimum proportionately in accordance with its length, said restrictor means being movable automatically by the varying pressure in said third conduit, the varying pressure in said third conduit being independent from the varying pressure in said first conduit.

2. A fluid pressure system including a plurality of conduits each adapted to contain a fluid under a varying pressure, and means connecting some of said conduits for producing a continuously variable pressure in one of said conduits that varies automatically as a function of the varying pressures in said other conduits, said connecting means including movable fluid restriction means connecting said one conduit and another of said conduits, said restriction means being of a shape as to vary the pressure between said one and other conduit from a maximum to a minimum proportionately in accordance with its length, said restriction means being automatically movable by the varying pressure in still another conduit, the varying pressure in said still another conduit being independent from the varying pressure in said other conduit.

3. A fluid system comprising, a first conduit containing fluid under a varying pressure, second and third fluid conduits, and means connecting said first and second conduits for producing a fluid pressure in said second conduit, said connecting means comprising a cylinder having a movable valve therein, said cylinder having inlet and outlet ports, one of said inlet ports being connected with said first conduit, one of said outlet ports being connected with said second conduit, said valve having an annular helical groove therein, said groove being in communication with said one inlet and outlet ports, said groove having a constant cross-section to vary the pressure from said inlet port to said outlet port from a maximum to zero proportionally in accordance with its length, means for moving said valve whereby the pressure in said second conduit varies from zero to the pressure in said first conduit automatically as a function of the change in pressure in said first conduit and the movement of said valve, a fluid under varying pressure in said third conduit, the varying pressure in said third conduit being independent from the varying pressure in said first conduit, said valve having one end thereof adapted to be acted upon by the fluid pressure in said third conduit for automatically moving said valve and said groove in one direction in response to a change in pressure of the fluid in said third conduit, and yieldable means acting on the opposite end of said valve for opposing movement of said valve by the fluid pressure in said third conduit, said second conduit pressure automatically varying as a function of the pressures in said first and third conduits.

References Cited in the file of this patent

UNITED STATES PATENTS

| | | |
|---|---|---|
| 993,831 | Junggren | May 30, 1911 |
| 1,879,197 | Greenwald | Sept. 27, 1932 |
| 2,402,729 | Buchanan | June 25, 1946 |
| 2,643,055 | Sorterberg | June 23, 1953 |
| 2,739,607 | Murray | Mar. 27, 1956 |